(12) United States Patent
Anderson

(10) Patent No.: US 6,223,387 B1
(45) Date of Patent: May 1, 2001

(54) LEAF PICK-UP AND TRANSPORT BIN ASSEMBLY

(76) Inventor: Mark D. Anderson, 540 Marcy St., Ottawa, IL (US) 61350

( * ) Notice: Subject to any disclaimer, the term of this patent is extended or adjusted under 35 U.S.C. 154(b) by 0 days.

(21) Appl. No.: 09/414,031

(22) Filed: Sep. 16, 1999

(51) Int. Cl.$^7$ .................................................. E01H 1/08
(52) U.S. Cl. ............................. 15/340.1; 15/347; 406/40; 406/41
(58) Field of Search .................................... 15/314, 340.1, 15/347; 406/39, 40, 41, 43

(56) References Cited

U.S. PATENT DOCUMENTS

| | | | | |
|---|---|---|---|---|
| 705,585 | * | 7/1902 | Hope | 15/347 |
| 2,887,714 | * | 5/1959 | Hanson | 15/340.1 |
| 3,588,179 | * | 6/1971 | Gifford | 406/40 |
| 3,665,545 | * | 5/1972 | Beekman | 15/340.1 |
| 3,717,901 | * | 2/1973 | Johnstone | 15/340.1 |
| 5,630,247 | * | 5/1997 | Venia | 15/340.1 |
| 5,718,017 | * | 2/1998 | Pavlick | 15/340.1 |
| 6,003,195 | * | 12/1999 | Whitney | 15/340.1 |
| 6,029,312 | * | 2/2000 | Whitney | 15/347 |

* cited by examiner

Primary Examiner—Terrence R. Till

(74) Attorney, Agent, or Firm—Ernest Kettelson

(57) ABSTRACT

A leaf pick-up and transport bin assembly comprises a truck with a truck box and a trailer with a trailer box pulled behind, a swivel mounting platform between the truck and trailer, a blower operated leaf pick-up machine mounted on the swivel platform whereby its vacuum intake port opening to one side can be rotated so its vacuum intake port faces and opens to the opposite side, a flexible elongated conduit extends from the vacuum intake port to suck in and pick up leaves throughout the area reachable by such flexible elongated conduit, and a rotatable airflow discharge port with a flexible discharge conduit connected thereto which can be rotated to face the truck and truck box in one position and to face the trailer and trailer box when rotated to a second position. The rear wall of the truck box includes an intake aperture to receive the discharge end of the flexible discharge conduit for blowing leaves into the truck box. The front wall of the trailer box includes an intake aperture to receive the discharge end of the flexible discharge conduit for blowing leaves into the trailer box. The truck and trailer boxes include vertically extending sideboards. Each box has an open top wall covered by a mesh cover to keep the leaves in the boxes while at the same time allowing blown in air to escape. Stowing brackets are provided on the right hand side wall of the truck box in the form of spaced apart J-shaped brackets to receive and hold the flexible elongated conduit connected to the vacuum intake port of the leaf pick-up machine when not in use and during transport to unload the picked up leaves.

16 Claims, 3 Drawing Sheets

LEAF PICK-UP AND TRANSPORT BIN ASSEMBLY

FIELD OF THE INVENTION

This invention relates to the field of leaf pick-up and disposal equipment, and in particular to one having two transport bins comprising a truck with its truck box and a trailer pulled behind with its trailer box, having a blower type leaf pick-up machine mounted between the truck and trailer on a swivel platform whereby its vacuum intake port can be rotated to face both sides of the truck and trailer for picking up leaves on both sides without having to turn the truck and trailer around. The airflow discharge conduit of the leaf pick-up machine can also be rotated to face the truck box and blow leaves therein when in one position and to face the trailer box and blow leaves therein when rotated to face the opposite direction.

BACKGROUND OF THE INVENTION

Prior art devices in this general field of which the inventor has become aware include those shown and described in the following United States Patents which are readily available to the public at large and others having an interest therein:

U.S. Pat. No. 5,630,247
U.S. Pat. No. 5,359,838
U.S. Pat. No. 5,107,566
U.S. Pat. No. 4,761,943
U.S. Pat. No. 4,700,534
U.S. Pat. No. 4,659,262
U.S. Pat. No. 4,574,420
U.S. Pat. No. 4,567,623
U.S. Pat. No. 4,366,594
U.S. Pat. No. 4,322,868
U.S. Pat. No. 3,995,754
U.S. Pat. No. 3,968,634
U.S. Pat. No. 3,618,157
U.S. Pat. No. 2,510,261

SUMMARY OF THE INVENTION

The invention in this case is an improvement over the prior art in that it provides a faster way to pick up leaves that have fallen to the ground and then transporting them to a disposal site. The invention comprises a truck and truck box with sideboards and a trailer with trailer box, also having sideboards, connected behind the truck, both of which can be filled with leaves picked up on both sides of the truck and trailer while they remain parked in the same location. A mounting platform having a swivel plate is connected between the truck and trailer. A blower operated leaf pick-up machine is mounted on the swivel plate so its vacuum intake port can be rotated to face one side of the truck and trailer when rotated to a first position and rotated to face the other side of the truck and trailer when rotated to a second position. This enables a workman to pick up leaves on both sides of the truck and trailer without having to move the truck and trailer. An elongated flexible conduit about twenty feet long with a large diameter of about ten inches or so is connected to the vacuum intake port of the leaf pick-up machine and moved around within the twenty foot radius defined by the elongated conduit to suck in leaves and flow them through the vacuum intake port of the machine. A swivel discharge spout with a flexible conduit extension on the top of the leaf pick-up machine can be rotated to face the truck box in one position and to face the trailer box when rotated to face in the opposite direction. The discharge end of the conduit extension is inserted in an intake aperture of the rear wall of the truck box when rotated to face in that direction for blowing leaves into the cavity of the truck box with its vertically extending sideboards. The discharge end of the conduit extension is inserted in an intake aperture of the front wall of the trailer box when rotated to face in that direction for blowing leaves into the cavity of the trailer box with its vertically extending sideboards. The top wall of the truck box and top wall of the trailer box are open and covered with a mesh member that keeps the leaves from blowing out while at the same time allowing the blown in air to escape. A carrier comprised of spaced apart J-shaped members is mounted along the right hand side wall of the truck box to stow the elongated flexible conduit connected to the vacuum intake port of the leaf pick-up machine when it is not in use and the truck with trailer are being driven to the disposal site.

DESCRIPTION OF PREFERRED EMBODIMENT

Figure 1:
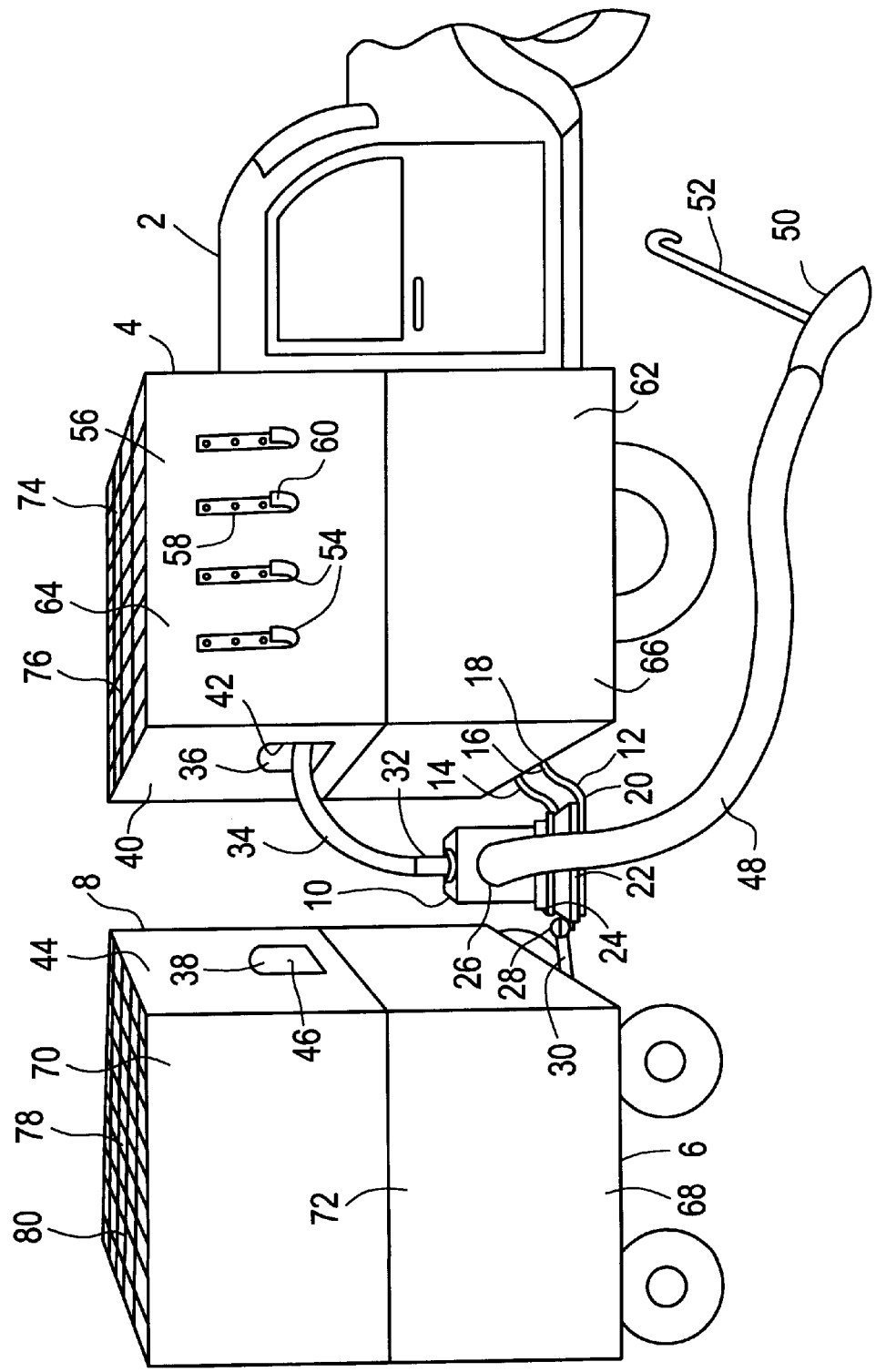
FIG. 1 is a perspective view from the side of the leaf pick-up and transport bin assembly in accordance with this invention showing the elongated flexible intake conduit in position for use and the discharge spout with its conduit extension in position to blow leaves into the truck box.
Figure 2:
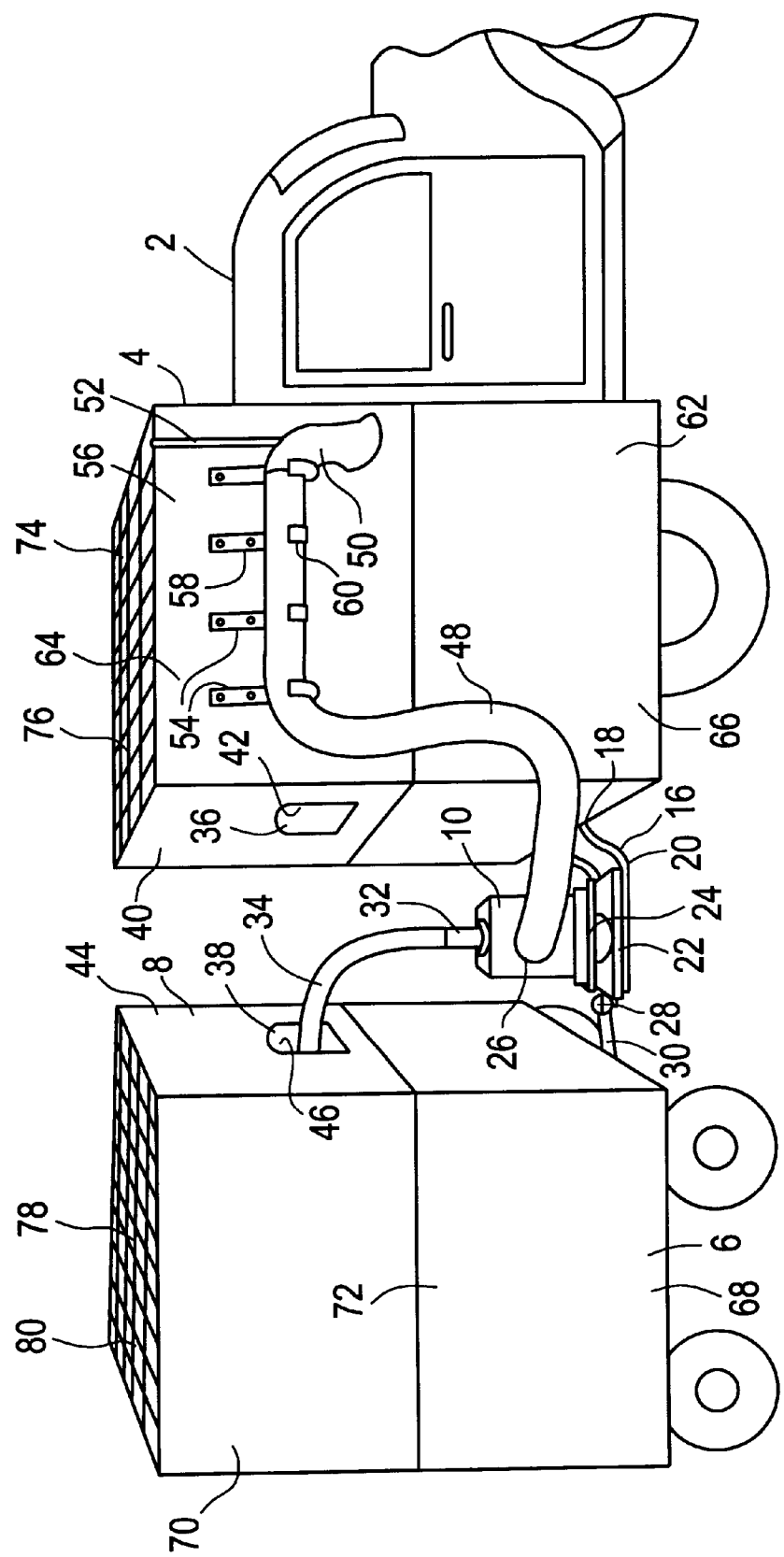
FIG. 2 is a perspective view as in FIG. 1 but showing the elongated flexible intake conduit stowed in the carrier brackets.
Figure 3:
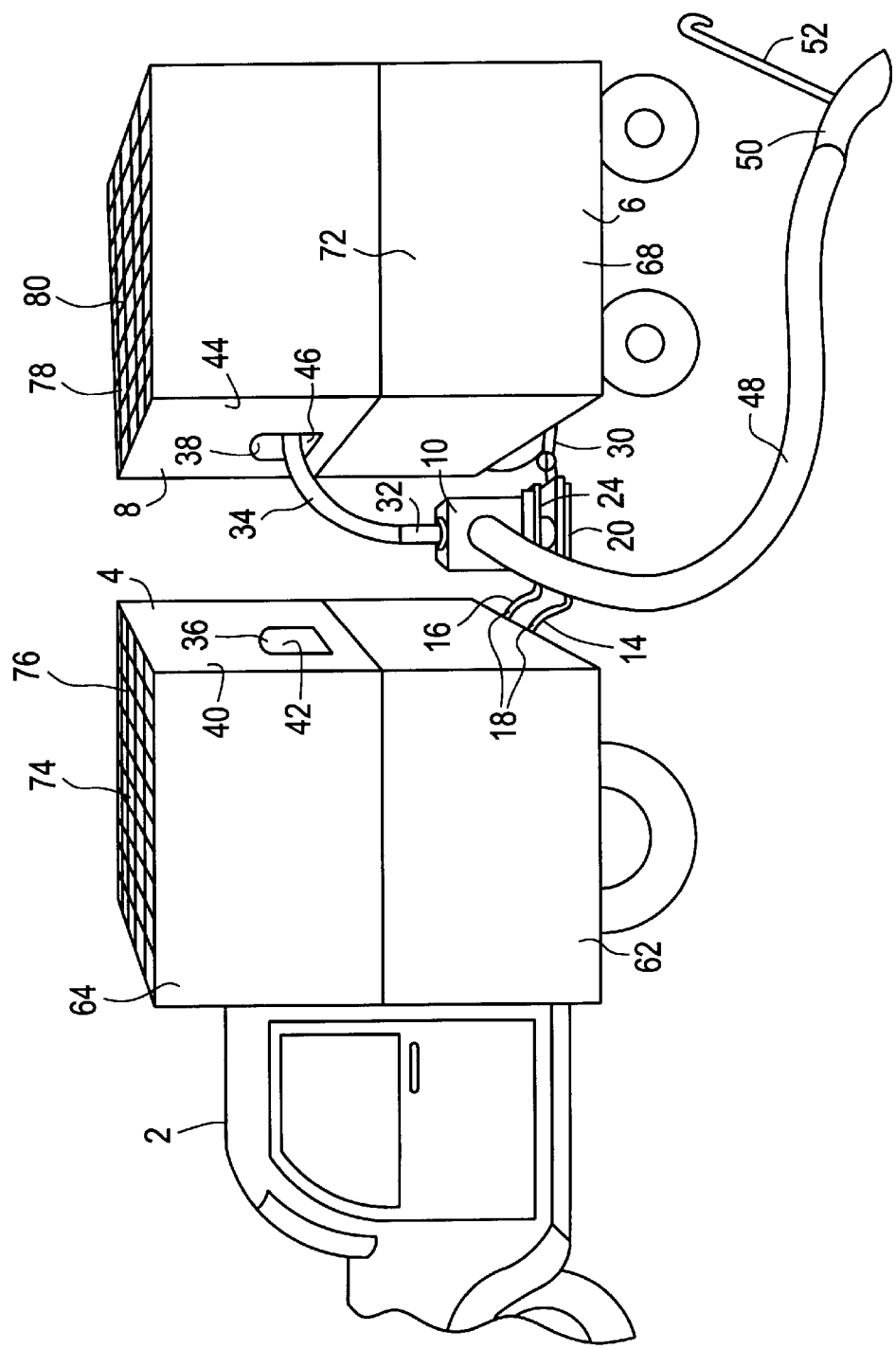
FIG. 3 is a perspective view from the opposite side of that in FIG. 1 showing the vacuum intake port and elongated intake conduit rotated to the opposite side for pick up of leaves from that side without having to move the truck and trailer, and showing the discharge spout with its conduit extension rotated to face in the opposite direction from that in FIG. 1 in position to blow leaves into the trailer box.

The leaf vacuum and double transport bin assembly in accordance with this invention comprises a motorized truck 2 having a first transport bin 4 and a trailer 6 hitched to the rear of the truck 2 having a second transport bin 8. A leaf vacuum machine 10 is mounted between the truck 2 and the trailer 6 on a mounting frame assembly 12. The mounting frame assembly 12 comprises a pair of support arms 14 and 16 having forward ends 18 connected to a rear portion of the frame of the truck 2, the support arms sloping downwardly from their forward ends 18 to a horizontal portion 20 on which a platform 22 is secured. A swivel plate 24 is provided on the platform 22 and extends upward therefrom. The leaf vacuum machine 10 is mounted on and secured to the swivel plate 24. The swivel plate 24 is mounted on a fully rotatable swivel member extending between the platform 22 and swivel plate 24 whereby the swivel plate 24 and leaf vacuum machine thereon may be rotated a full three hundred and sixty degrees if desired. In normal use, it is rotated one hundred and eighty degrees to rotate the intake port 26 on the side of the leaf vacuum machine 10 from facing toward one side of the truck 2 and trailer 6 to face toward the opposite side. Thus, leaves can be vacuumed into the leaf vacuum machine 10 from both sides of the truck 2 and trailer 6.

A trailer hitch 28 is provided at the rear of the mounting frame assembly 12 for connection thereto of the tongue 30 of the trailer 6.

A swivel discharge spout 32 extends upward from the top of the leaf vacuum machine 10 which is rotatable a full three hundred and sixty degrees. A flexible conduit extension 34 is connected to the discharge spout 32 having a length sufficient to reach and enter the intake aperture 36 of the first transport bin 4 on the truck 2 when the discharge spout 32 is rotated in the direction toward the truck 2 and the intake aperture 38 of the second transport bin 8 on the trailer 6 when the discharge spout 32 is rotated to face in the opposite direction toward the trailer 6.

The intake aperture 36 is provided on the rear wall 40 of the first transport bin 4 and opens to the cavity 42 thereof. The intake aperture 38 is provided on the front wall 44 of the second transport bin 8 and opens to its cavity 46.

An elongated flexible leaf pick-up conduit 48 is provided having a length of about twenty feet in a preferred embodiment, connected at one end to the intake port 26 of the leaf vacuum machine 10 and having a leaf intake member 50 connected at its opposite end. A handle 52 is provided for a workman to grasp and move the intake member 50 and flexible conduit 48 to reach and pick up leaves in every portion of the area within a twenty foot radius of the leaf vacuum machine on that side of the truck and trailer toward which the intake port of the leaf vacuum machine 10 is then facing. The flexible leaf pick-up conduit 48 may if desired be longer or shorter than twenty feet to reach an area within a longer or shorter radius than 20 feet. The diameter of such flexible leaf pick-up conduit 48 and the intake port 26 of the leaf vacuum machine 10 is preferably between ten and twelve inches. Such diameter can be larger or smaller if desired.

A plurality of spaced apart carrier brackets 54 are secured to the outer surface of the right hand side or passenger side wall 56 of the first transport bin 4 on the truck 2 to receive the flexible leaf pick-up conduit 48 for stowing after a leaf pick-up job has been completed and the leaves are being transported to a disposal site. Four carrier brackets 54 are shown and described in this preferred embodiment, but there may be a greater or lesser number. Each carrier bracket 54 includes an elongated straight portion 58 which is secured to the side wall 56 terminating at its lower end in an integrally formed U-shaped portion 60 to receive and hold the flexible conduit 48 therein.

The first transport bin 4 comprises the truck box 62 and side board extensions 64 extending upwardly from the side walls 66 of the truck box 62. The second transport bin 8 comprises the trailer box 68 and side board extensions 70 extending upwardly from the side walls 72 of the trailer box 68. The top wall 74 of the first transport bin 4 is open with a mesh cover 76 in place over the open top wall 74 to keep the leaves in the bin while at the same time allowing air to escape as leaves are blown into the bin from the leaf vacuum machine 10. The top wall 78 of the second transport bin 8 is also open with a similar mesh cover 80 in place over the open top wall 78 to keep leaves in and allow air to escape as leaves are blown into the second transport bin 8.

In operation, the blower of the leaf vacuum machine creates a vacuum at its intake port 26 to draw picked-up leaves in through the flexible leaf pick-up conduit 48 and a discharge flow of air at its discharge spout 32 and extension 34 to blow the picked-up leaves into the transport bins. When the leaves on one side of the truck and trailer have been picked up, the leaf vacuum machine 10 is then rotated on the swivel plate 24 one hundred and eighty degrees to face its intake port 26 and flexible leaf pick-up conduit 48 toward the opposite side of the truck and trailer. The workman can then maneuver the leaf intake member 50 at the outer end of the flexible leaf pick-up conduit 48 to pick up leaves throughout the area on that opposite side of the truck and trailer which the leaf vacuum machine 10 blows into the transport bins.

I claim:

1. A leaf pick-up and transport bin assembly comprising a first transport bin, a second transport bin, a leaf pick-up machine having a vacuum intake port facing toward one side to draw leaves therein, an airflow discharge port to blow leaves outward therefrom, first extension means extending from said vacuum intake port for picking up leaves and flowing to said vacuum intake port, second extension means extending from said airflow discharge port for blowing leaves from said leaf pick-up machine, through said airflow discharge port and through said second extension means, first positioning means for positioning said vacuum intake port of said leaf pick-up machine and said first extension means extending therefrom to face toward said one side when in a first position and toward the opposite side when in a second position, second positioning means for positioning said second extension means to face toward said first transport bin when in a first position and toward said second transport bin when in a second position.

2. A leaf pick-up and transport bin assembly as set forth in claim 1, including a truck having a truck cargo box and wherein said first transport bin includes said truck cargo box, said first transport bin having an open top wall, a first leaf restraining cover over said open top wall of said first transport bin, said first leaf restraining cover having air passage means for air blown into said first transport bin to escape there through, said leaf pick-up and bin transport assembly includes a trailer having a trailer cargo box, said second transport bin includes said trailer cargo box, said second transport bin having an open top wall, a second leaf restraining cover over said open top wall of said second transport bin, said second leaf restraining cover having air passage means for air blown into said second transport bin to escape there through.

3. A leaf pick-up and transport bin assembly as set forth in claim 2, wherein said leaf pick-up machine is positioned between said truck and said trailer.

4. A leaf pick-up and transport bin assembly as set forth in claim 2, including a mounting member connected between said truck and said trailer, said first positioning means includes first swivel means on said mounting member for rotating an item thereon to face toward one side in a first position and to face toward the opposite side when rotated to a second position, said leaf pick-up machine being secured to said first swivel means whereby said vacuum intake port thereof faces toward said one side when said first swivel means is rotated to said first position and faces toward said opposite side when said first swivel means is rotated to said second position.

5. A leaf pick-up and transport bin assembly as set forth in claim 4, wherein said second positioning means includes second swivel means for rotating said airflow discharge port and said second extension means extending therefrom between said first position and said second position.

6. A leaf pick-up and transport bin assembly as set forth in claim 2, wherein said first transport bin includes first vertically extending sideboards extending upwardly from said truck cargo box, said second transport bin includes second vertically extending sideboards extending upwardly from said trailer cargo box, said first transport bin includes a rearwardly facing end wall, said second transport bin includes a forwardly facing end wall, a first intake aperture in said rearwardly facing end wall of said first transport bin to receive therein an end portion of said second extension means when said second extension means is rotated to said first position facing toward said first transport bin, a second intake aperture in said forwardly facing end wall of said second transport bin to receive therein said end portion of said second extension means when said second extension means is rotated to said second position facing toward said second transport bin.

7. A leaf pick-up and transport bin assembly as set forth in claim 1, wherein said first extension means extending from said vacuum intake port comprises an elongated flexible conduit connected at one end to said vacuum intake port and open at its opposite end to receive leaves picked up from the ground therein.

8. A leaf pick-up and transport bin assembly as set forth in claim 7, wherein said elongated flexible conduit includes a leaf intake member at its said opposite end.

9. A leaf pick-up and transport bin assembly as set forth in claim 8, including a handle extending from said leaf intake member for a workman to grasp and move to pick up leaves on the ground for flowing to said leaf pick-up machine.

10. A leaf pick-up and transport bin assembly as set forth in claim 7, wherein said elongated flexible conduit has a longitudinal dimension of about twenty feet.

11. A leaf pick-up and transport bin assembly as set forth in claim 7, wherein said elongated flexible conduit has a diameter no less than ten inches.

12. A leaf pick-up and transport bin assembly as set forth in claim 7, wherein said elongated flexible conduit has a diameter no more than twelve inches.

13. A leaf pick-up and transport bin assembly as set forth in claim 1, wherein said second extension means extending from said airflow discharge port comprises a flexible discharge conduit connected at one end to said airflow discharge port and open at its opposite end to blow leaves from said leaf pick-up machine through said flexible discharge conduit and out through its said open opposite end.

14. A leaf pick-up and transport bin assembly as set forth in claim 13, wherein said flexible discharge conduit has a longitudinal dimension sufficient to reach from said airflow discharge port to said first transport bin when said second positioning means is in its said first position and to reach from said airflow discharge port to said second transport bin when said second positioning means is in its said second position.

15. A leaf pick-up and transport bin assembly as set forth in claim 1, wherein said first extension means includes an elongated flexible conduit, including stowing means on one of said first and second transport bins to receive said elongated flexible conduit for stowing during transport and when not in use picking up leaves.

16. A leaf pick-up and transport bin assembly as set forth in claim 15, wherein said one of said first and second transport bins includes a side wall facing the right hand side during transport, said stowing means includes a plurality of spaced apart bracket members, each having an elongated straight portion secured to said side wall and each terminating at their respective lower ends in an integrally formed U-portion to receive and hold respective portions of said elongated flexible conduit therein.

* * * * *